Dec. 20, 1960   F. J. MACHOVEC   2,964,884
LAWN MOWER SHARPENER WITH BED KNIFE GRINDER
Filed Feb. 7, 1958

Alfred J. Machovec,
INVENTOR.

By his Attorneys

Harris, Kiech, Foster & Harris.

2,964,884
LAWN MOWER SHARPENER WITH BED KNIFE GRINDER

Fred J. Machovec, 160 N. Fair Oaks Ave., Pasadena 1, Calif.

Filed Feb. 7, 1958, Ser. No. 713,902

7 Claims. (Cl. 51—56)

The present invention relates in general to lawn mower sharpeners and, in some respects, constitutes improvements on the lawn mower sharpener disclosed in my Patent No. 2,466,905, issued April 12, 1949. The present application discloses structure disclosed and claimed in my copending patent applications Serial No. 685,334, filed September 20, 1957, now Patent No. 2,879,629, granted March 31, 1959, and Serial No. 743,555, filed June 23, 1958.

As general background, the lawn mower sharpener of the patent mentioned includes a supporting structure, generally horizontal track means extending across the front of the supporting structure, means carried by the supporting structure for positioning a lawn mower to be sharpened alongside and rearwardly of the track means, a carriage movable along the track means, and a grinding wheel on the carriage and adapted to sharpen the lawn mower.

A primary object of the present invention is to provide a lawn mower sharpener of the foregoing general character which is capable of sharpening the bed knife of a reel-type lawn mower without removing the cutter bar which carries the bed knife from the mower, or without detaching the bed knife from the cutter bar.

More particularly, an object of the invention is to provide a lawn mower sharpener having means for mounting the grinding wheel on the carriage in such a manner that the grinding wheel may be inserted between the reel and the bed knife to bring one of the sides of the grinding wheel into engagement with the upper surface of the bed knife.

Another object is to mount the grinding wheel on the carriage with its axis of rotation perpendicular to the track means and in such a manner that it may be inserted between the reel and the bed knife, whereby one of the sides of the grinding wheel engages the upper surface of the bed knife to grind same as the carriage is moved along the track means with the bed knife parallel to the track means.

Still another object is to provide a lawn mower sharpener which includes a crank comprising a shaft rotatably mounted on the carriage with its axis perpendicular to the track means, and comprising an arm extending transversely from the shaft, the grinding wheel being rotatably mounted on the arm of the crank with its axis of rotation perpendicular to the track means. With this construction, the crank may be rotated about the axis of the shaft to permit insertion of the grinding wheel between the bed knife and the reel when the lawn mower is positioned adjacent the track means with its bed knife parallel thereto, such insertion of the grinding wheel between the bed knife and the reel resulting in engagement of one of the sides of the grinding wheel with the upper surface of the bed knife due to the fact that the grinding wheel is mounted on the crank arm with its axis of rotation perpendicular to the track means.

Another object of the invention is to provide an adjustment means for pivoting the arm relative to the shaft about an axis perpendicular to the axis of the shaft to insure that the axis of rotation of the grinding wheel is oriented in a direction absolutely perpendicular to the track means so that the grinding wheel will be parallel to the bed knife when the latter is parallel to the track means.

Another object is to provide releasable means for locking the shaft of the crank against rotation relative to the carriage so as to maintain the grinding wheel in the desired position once it has been inserted between the bed knife and the reel.

Another object is to provide reel displacing means on the crank, and particularly on the arm of the crank, for rotating the reel out of the way of the grinding wheel as the grinding wheel is moved along the upper surface of the bed knife as the result of movement of the carriage along the track means.

A further object is to provide a drive for the grinding wheel which includes a driven pulley connected to and rotatable about the axis of rotation of the grinding wheel, two idling pulleys mounted on and located on opposite sides of the shaft of the crank and rotatable about an axis perpendicular to the axis of such shaft, a driving pulley mounted on the carriage and rotatable about an axis parallel to the track means, and an endless belt trained over the driving, idling and driven pulleys, and driving pulley preferably being mounted on the shaft of an electric motor carried by the carriage.

A further object is to provide spring means biasing the shaft of the crank axially thereof in a direction to tension the endless belt.

The foregoing objects, advantages, features and results of the present invention, together with various other objects, advantages, features and results of the invention which will be evident to those skilled in the lawn mower sharpening art in the light of this disclosure, may be attained with the exemplary embodiment of the invention described in detail hereinafter and illustrated in the accompanying drawing, in which.

Figure 1:
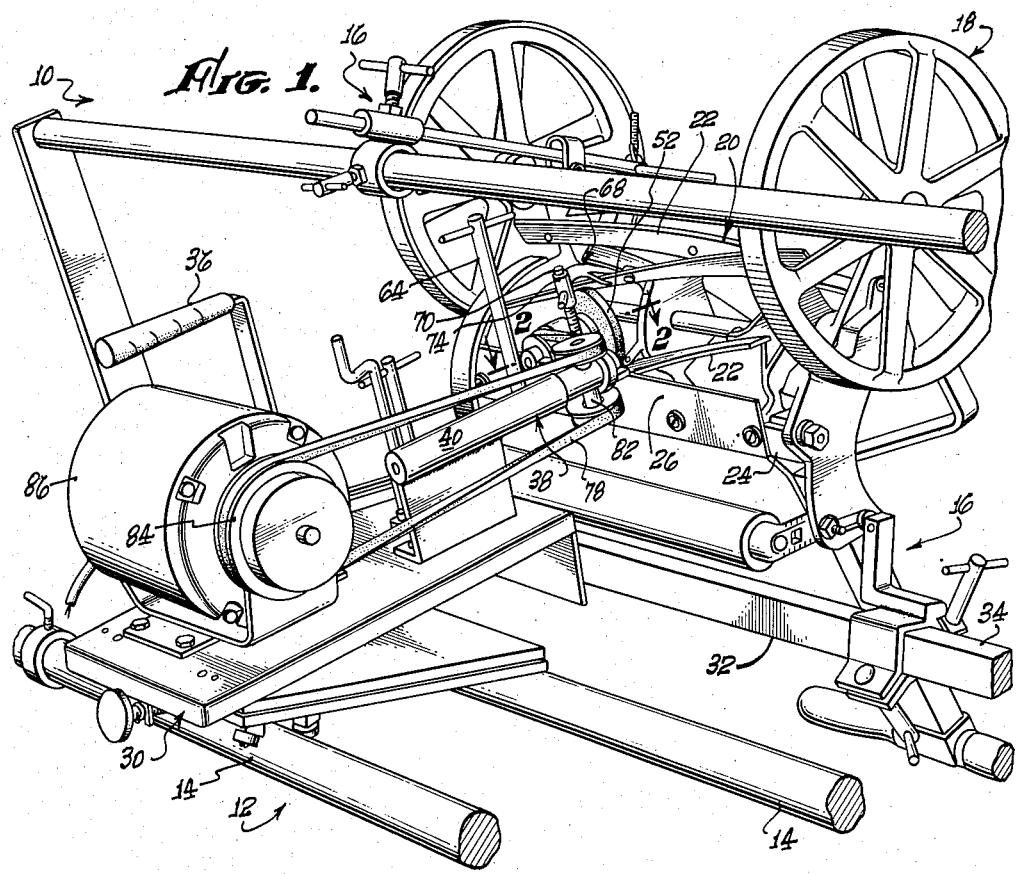
Fig. 1 is a fragmentary perspective view of the lawn mower sharpener of the invention in use to grind the bed knife of a reel-type lawn mower.

In the drawing and in the descritpion which follows, only those portions of the structure of the lawn mower sharpener of my prior patent are disclosed which are necessary to an understanding of the improvements constituting the present invention. Consequently, reference is hereby made to my prior patent for a complete disclosure of any portions of the lawn mower sharpener of the invention not specifically disclosed herein.

Referring particularly to Fig. 1 of the drawing, the lawn mower sharpener is designated generally by the numeral 10 and includes a track means 12 shown as comprising two substantially parallel tracks 14 in the form of cylindrical rods the axes of which are disposed in substantially the same horizontal plane. The tracks 14 extend across the front of the lawn mower sharpener 10 and located rearwardly of and alongside the tracks is a lawn-mower positioning means 16 which carries a reel-type lawn mower 18 including a reel 20 having helical blades 22 and a cutter bar 24 carrying a bed knife 26. The lawn-mower positioning means 16 is adjustable transversely of the tracks 14 to properly locate the lawn mower 18 relative to the tracks and, more particularly, to so locate the lawn mower relative to the tracks that the bed knife 26 is parallel thereto, the upper surface of the bed knife facing away from the tracks 14. Reference is hereby made to my aforementioned prior patent and to my copending application Serial No. 743,555 for a more complete disclosure of the manner in which the positioning means 16 is adjusted and the manner in which it holds the lawn mower 18, such structure, per se, forming no part of the present invention.

Movable along the tracks 14 of the lawn mower sharpener 10 is a carriage 30 which is completely disclosed in my Patent No. 2,879,629. Reference to that application for a complete disclosure of the carriage 30 is hereby invited. Stops 32 on a bar 34 forming part of the lawn-mower positioning means 16 limit travel of the carriage 30 along the tracks 14 through a distance equal to the length of the bed knife 26, the carriage being movable along the tracks by means of a handle 36 thereon.

Secured to the carriage 30 is a grinding wheel mount 38 which includes a sleeve 40 oriented with its axis perpendicular to the tracks 14. Rotatable and reciprocable in the sleeve 40 is a shaft 42 of a crank 44, the crank being biased rearwardly toward the lawn mower 18 by a compression spring 45, Fig. 2, disposed within the sleeve 40 and seated against a shoulder on the shaft. This spring performs a function to be described.

The crank 44 includes an arm 46 which extends transversely from the shaft 42 and which is provided at its outer end with a bearing 48 for a shaft 50 having a grinding wheel 52 fixed thereon, the axis of the grinding-wheel shaft 50 being perpendicular to the tracks 14, and thus perpendicular to the bed knife 26 when it is positioned parallel to the tracks. The crank arm 46 is connected to the shaft 42 by a pivot means 54 providing a pivot axis perpendicular to the axis of the shaft 42 and oriented in a direction perpendicular to the direction of the tracks 14. This permits pivoting of the arm 46 relative to the shaft 42 in a direction such as to permit orienting the axis of the grinding wheel 52 in a direction precisely perpendicular to the tracks 14, and thus precisely perpendicular to the bed knife 26 when the latter is parallel to the tracks. This insures uniform engagement of one side of the grinding wheel 52 with the upper surface of the bed knife 26, shown in Fig. 2.

In order to provide for adjustment of the crank arm 46 relative to the shaft 42 about the axis of the pivot means 54 for the purpose just described, I provide an adjustment means 56 comprising two adjusting screws 58 respectively threaded through the arm 46 on opposite sides of the shaft 42 and engaging a collar 60 on the shaft. As will be apparent, by unscrewing one of the adjusting screws 58 and threading the other farther through the arm 46, the arm may be pivoted in one direction or the other to make the axis of the grinding-wheel shaft 50 precisely perpendicular to the tracks 14, thereby insuring that the sides of the grinding wheel are parallel to the bed knife 26 when the latter is parallel to the tracks.

Figure 2:
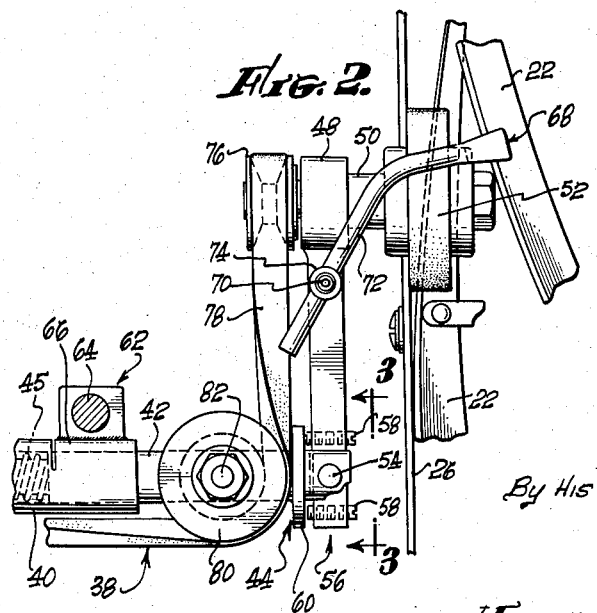
Fig. 2 is an enlarged, fragmentary view, partially in plan and partially in section, taken as indicated by the arrowed line 2—2 of Fig. 1.
Figure 3:
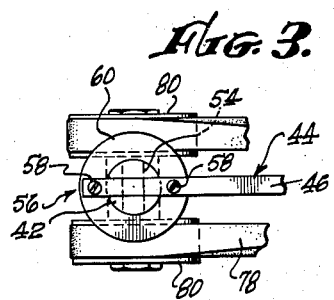
Fig. 3 is a fragmentary elevational view taken along the arrowed line 3—3 of Fig. 2 of the drawing.

It will be apparent that, with the foregoing construction, by rotating the crank 44, the grinding wheel 52 may be moved from a position above the bed knife 26 downwardly between the bed knife and the reel 20 into a position such that one side of the grinding wheel is in engagement with the upper surface of the bed knife, as shown in Fig. 2 of the drawing. Once the proper position of the grinding wheel 52 relative to the bed knife 26 has been established by rotating the crank 44 in this manner, the crank may be locked in the desired position by a clamping means 62 comprising a clamping screw 64 acting on a split portion 66 of the sleeve 40.

As the carriage 30 is moved along the tracks 14 with one side of the grinding wheel 52 in engagement with the upper surface of the bed knife 26 to flat grind such surface, it is necessary to rotate the reel 20 to keep the reel blades 22 out of the way of the grinding wheel. For this purpose, the crank 44 carries a reel displacing means 68 shown as comprising a stud 70 secured to the crank arm 46 and a bifurcated finger 72 carried by a nut 74 threaded on the stud and adapted to straddle one of the reel blades 22. As will be apparent, the position of the finger 72 may be varied by rotating it and the nut 74 so as to insure proper interengagement of the finger and one of the reel blades 22.

Considering the manner in which the grinding wheel 52 is driven, fixed on the grinding-wheel shaft 50 on the opposite side of the bearing 48 from the grinding wheel is a driven pulley 76 rotatable about the same axis as the grinding wheel. Trained over this pulley is an endless belt, preferably a V-belt 78, which is also trained around two idling pulleys 80 mounted on a shaft 82 carried by the shaft 42 and on opposite sides of the shaft 42, the idling pulleys being rotatable about an axis perpendicular to the axis of the shaft 42. The belt 78 is further trained around a driving pulley 84 which is rotatable about an axis parallel to the tracks 14, the driving pulley 84 being shown as mounted on the shaft of an electric motor 86 carried by the carriage 30.

The spring 45 acts on the shaft 42 of the crank 44 to bias the crank in a direction to tension the belt 78, the belt tension established by this spring being maintained by the clamping means 62. As will also be apparent, as the crank 44 is rotated from a position wherein the grinding wheel 52 is above the bed knife 26 to a position wherein the grinding wheel is in engagement with the upper surface of the bed knife and between the bed knife and the reel 20, the two fore-and-aft runs of the belt 78 merely twist relative to each other without affecting the driving connection between the motor 86 and the grinding wheel.

Considering the over-all operation of the lawn mower sharpener 10, the lawn mower 18 is first mounted on the sharpener by means of the lawn-mower positioning means 16, which positioning means is adjusted as required to position the bed knife 26 parallel to the tracks 14. Assuming that the axis of rotation of the grinding wheel 52 has been located perpendicular to the bed knife 26 by the adjustment means 56, the crank 44 is rotated to swing the grinding wheel downwardly between the bed knife and the reel 20 so as to bring one side of the grinding wheel into engagement with the upper surface of the bed knife, as shown in the drawing. The grinding wheel 52 is then locked in this position by the clamping means 62. If it is necessary to move the grinding wheel 52 in the fore-and-aft direction to properly engage the side of the grinding wheel with the upper surface of the bed knife, this is accomplished by bodily fore-and-aft movement of a portion of the carriage 30 as more fully disclosed in my aforementioned Patent No. 2,879,629. The position of the finger 72 of the reel displacing means 68 on the stud 70 is adjusted so that this finger properly engages one of the reel blades 22 in a manner to continuously rotate the reel out of the way of the grinding wheel 52 as the latter is moved along the bed knife 26 in response to movement of the carriage 30 along the tracks 14. Motion of the carriage 30 along the tracks 14 is limited to a distance equal to the travel of the grinding wheel 52 necessary to grind the upper surface of the bed knife 26 properly by the stops 32.

Once the foregoing adjustments have been made, it is merely necessary to move the carriage 30 along the tracks 14 to grind the bed knife 26. The grinding operation completed, the clamping means 62 is released to permit swinging the grinding wheel 52 upwardly clear of the bed knife 26 and the reel 20 whereupon the lawn mower 18 may be removed.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim as my invention:

1. In a lawn mower sharpener, the combination of: track means; means for positioning a reel-type lawn mower having a bed knife to be sharpened alongside said track means with the bed knife parallel to said track means; a carriage movable along and carried by said track means; a crank including a shaft rotatably mounted on said carriage with its axis perpendicular to said track means, said crank including an arm extending transversely from said shaft; a grinding wheel rotatably mounted on said arm with its axis of rotation perpendicular to said track means and parallel to said axis of said shaft, whereby said crank may be rotated relative to said carriage to insert said grinding wheel between the reel and the bed knife of the lawn mower, and whereby one of the sides of the said grinding wheel is engageable with the upper surface of the bed knife; and reel displacing means mounted on said crank and engageable with the reel of the lawn mower to rotate the reel out of the way of said grinding wheel as said grinding wheel is moved along the bed knife in response to movement of said carriage along said track means.

2. In a lawn mower sharpener, the combination of: track means; means for positioning a reel-type lawn mower having a bed knife to be sharpened alongside said track means with the bed knife parallel to said track means; a carriage movable along and carried by said track means; a crank including a shaft rotatably mounted on said carriage with its axis perpendicular to said track means, said crank including an arm extending transversely from said shaft; a grinding wheel rotatably mounted on said arm with its axis of rotation perpendicular to said track means and parallel to said axis of said shaft, whereby said crank may be rotated relative to said carriage to insert said grinding wheel between the reel and the bed knife of the lawn mower, and whereby one of the sides of the said grinding wheel is engageable with the upper surface of the bed knife; and reel displacing means mounted on said crank and engageable with the reel of the lawn mower to rotate the reel out of the way of said grinding wheel as said grinding wheel is moved along the bed knife in response to movement of said carriage along said track means, said reel displacing means including a finger engageable with one of the blades of the reel and mounted on said arm of said crank.

3. In combination: track means; a carriage movable along and carried by said track means; a crank including a shaft rotatably mounted on said carriage with its axis perpendicular to said track means, said crank including an arm extending transversely from said shaft, said arm being pivotable relative to said shaft about an axis perpendicular to the axis of said shaft; a grinding wheel rotatably mounted on said arm with its axis of rotation perpendicular to said track means; adjustment means for pivoting said arm relative to said shaft about said axis perpendicular to the axis of said shaft to orient the axis of rotation of said grinding wheel absolutely perpendicularly of said track means; and means for rotating said grinding wheel.

4. In combination: track means; a carriage movable along and carried by said track means; a crank including a shaft rotatably mounted on said carriage with its axis perpendicular to said track means, said crank including an arm extending transversely from said shaft; a grinding wheel rotatably mounted on said arm with its axis of rotation perpendicular to said track means; and means for rotating said grinding wheel, including a driven pulley connected to and rotatable about the axis of rotation of said grinding wheel, two idling pulleys mounted on and located on opposite sides of said shaft and rotatable about an axis perpendicular to the axis of said shaft, a driving pulley mounted on said carriage and rotatable about an axis parallel to said track means, and an endless belt trained over said driving, idling and driven pulleys.

5. In combination: track means; a carriage movable along and carried by said track means; a crank including a shaft rotatably mounted on said carriage with its axis perpendicular to said track means, said crank including an arm extending transversely from said shaft; a grinding wheel rotatably mounted on said arm with its axis of rotation perpendicular to said track means; means for rotating said grinding wheel, including a driven pulley connected to and rotatable about the axis of rotation of said grinding wheel, two idling pulleys mounted on and located on opposite sides of said shaft and rotatable about an axis perpendicular to the axis of said shaft, a driving pulley mounted on said carriage and rotatable about an axis parallel to said track means, and an endless belt trained over said driving, idling and driven pulleys; and spring means for biasing said shaft axially thereof in a direction to tension said belt.

6. In combination: track means; a carriage movable along and carried by said track means; a crank including a shaft rotatably mounted on said carriage with its axis perpendicular to said track means, said crank including an arm extending transversely from said shaft; a grinding wheel rotatably mounted on said arm with its axis of rotation perpendicular to said track means and parallel to said axis of said shaft; power means on said carriage; and flexible drive means connecting said grinding wheel to said power means and extending along said shaft and said arm.

7. In combination: track means; a carriage movable along and carried by said track means; a crank including a shaft rotatably mounted on said carriage with its axis perpendicular to said track means, said crank including an arm extending transversely from said shaft; a grinding wheel rotatably mounted on said arm with its axis of rotation perpendicular to said track means; power means on said carriage; tensionable drive means connecting said grinding wheel to said power means and extending along said shaft and said arm; and means for moving said crank away from said power means to tension said drive means.

References Cited in the file of this patent

UNITED STATES PATENTS

| | | |
|---|---|---|
| 950,560 | Root | Mar. 1, 1910 |
| 1,820,777 | Calhoun | Aug. 25, 1931 |
| 2,718,097 | Bradley | Sept. 20, 1955 |